(12) United States Patent
Mizoguchi

(10) Patent No.: US 7,478,230 B2
(45) Date of Patent: Jan. 13, 2009

(54) COMPUTER SYSTEM AND FAILED COMPUTER REPLACING METHOD TO THE SAME SYSTEM

(75) Inventor: Kenichi Mizoguchi, Fuchu (JP)

(73) Assignees: Kabushiki Kaisha Toshiba, Tokyo (JP); Toshiba Solutions Corporation, Tokyo (JP)

(*) Notice: Subject to any disclaimer, the term of this patent is extended or adjusted under 35 U.S.C. 154(b) by 35 days.

(21) Appl. No.: 10/556,051

(22) PCT Filed: May 7, 2004

(86) PCT No.: PCT/JP2004/006500
§ 371 (c)(1),
(2), (4) Date: Aug. 24, 2006

(87) PCT Pub. No.: WO2004/099990
PCT Pub. Date: Nov. 18, 2004

(65) Prior Publication Data
US 2007/0067613 A1    Mar. 22, 2007

(30) Foreign Application Priority Data
May 9, 2003    (JP)    ............................. 2003-132117

(51) Int. Cl.
G06F 9/00    (2006.01)
G06F 15/177    (2006.01)
G06F 9/24    (2006.01)
G06F 11/00    (2006.01)

(52) U.S. Cl. ............................... 713/1; 713/2; 713/100; 714/13

(58) Field of Classification Search .................... 713/1, 713/2, 100; 714/13
See application file for complete search history.

(56) References Cited

U.S. PATENT DOCUMENTS 5,796,934 A * 8/1998 Bhanot et al. .................. 714/4
5,852,724 A * 12/1998 Glenn et al. ................. 709/239
5,996,086 A * 11/1999 Delaney et al. ................ 714/4
6,484,229 B1 * 11/2002 Ichikawa et al. ............... 711/4

(Continued)

FOREIGN PATENT DOCUMENTS

JP    6-231101    8/1994

(Continued)

OTHER PUBLICATIONS

Kaneko et al., "Cluster Software", Toshiba Review, vol. 54, No. 12, pp. 18-21, (1999).

(Continued)

Primary Examiner—Thomas Lee
Assistant Examiner—Ji H Bae
(74) Attorney, Agent, or Firm—Finnegan, Henderson, Farabow, Garrett & Dunner, L.L.P.

(57) ABSTRACT

When a computer (C1) fails, a failed computer search process (FP) that operates on the computer (C1) is started by another computer such as a computer (C2). When the search process (FP) detects the failed computer (C1), the search process (FP) selects for a provisioning computer (C5) using a provisioning computer search unit (PP2). A boot image setting unit (BS2) selects a storage device (D1) which stores a boot image that has been processed by the failed computer (C1). A boot unit (BB2) boots the selected provisioning computer (C5) using the boot image stored in the selected storage device (D1).

11 Claims, 12 Drawing Sheets

U.S. PATENT DOCUMENTS

| | | | |
|---|---|---|---|
| 6,609,213 B1 * | 8/2003 | Nguyen et al. | 714/4 |
| 6,874,103 B2 * | 3/2005 | Cepulis | 714/13 |
| 2001/0056554 A1 * | 12/2001 | Chrabaszcz | 714/13 |
| 2004/0172574 A1 * | 9/2004 | Wing et al. | 714/4 |

FOREIGN PATENT DOCUMENTS

| | | |
|---|---|---|
| JP | 10-105423 | 4/1998 |
| JP | 2001-256071 | 9/2001 |

OTHER PUBLICATIONS

International Preliminary Report on Patentability and Written Opinion of the International Searching Authority for International Application No. PCT/JP2004/006500 (Mar. 23, 2006).

US 7,278,054, 10/2007, Davies et al. (withdrawn)*

* cited by examiner

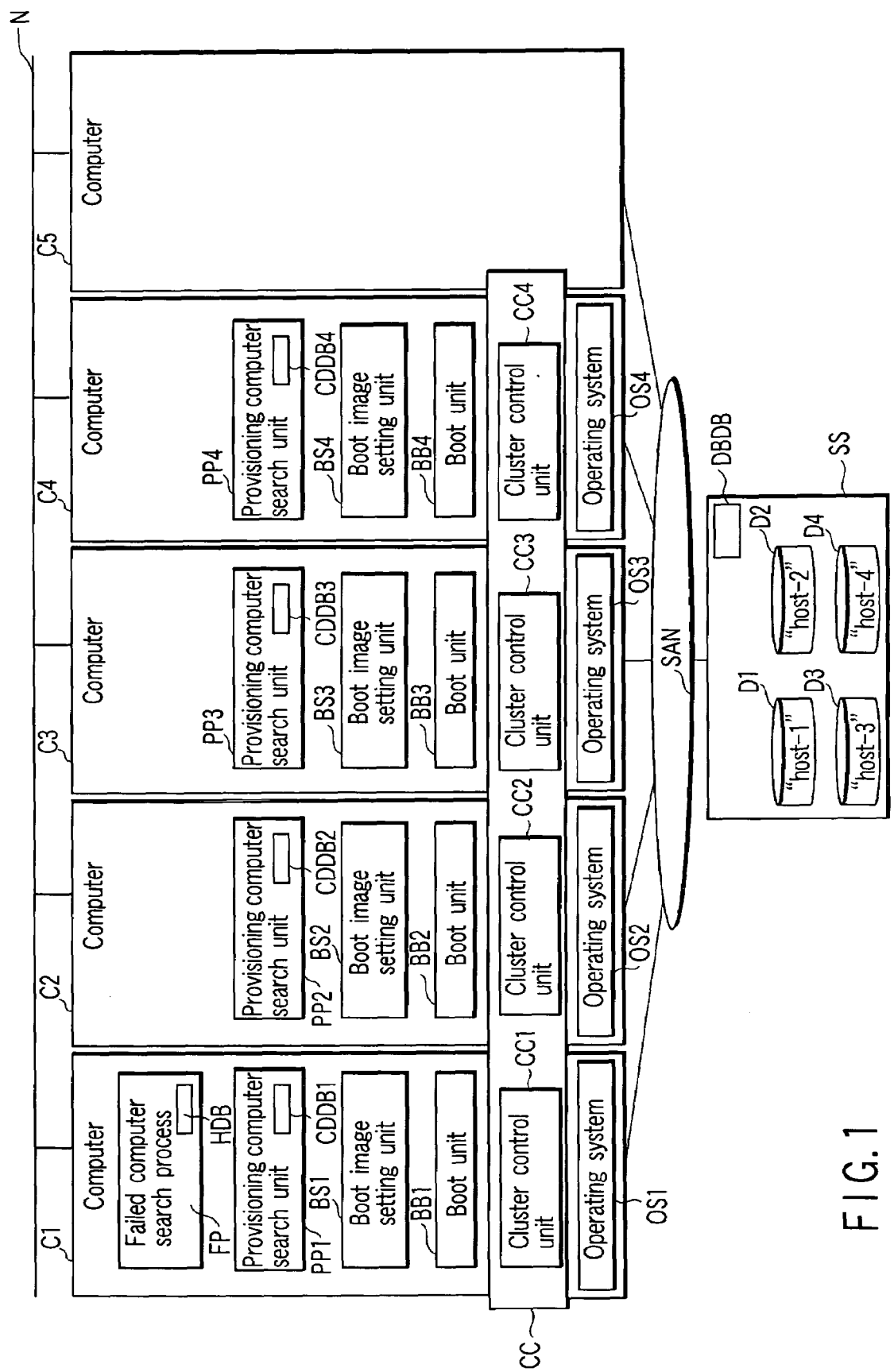
F I G. 1

CDDBi
(i=1,2,3,4)

| Computer | Status | Disk |
|---|---|---|
| C1 | S | D1 |
| C2 | S | D2 |
| C3 | S | D3 |
| C4 | S | D4 |
| C5 | P | — |

DBDB

| Disk | Boot computer |
|---|---|
| D1 | C1 |
| D2 | C2 |
| D3 | C3 |
| D4 | C4 |

HDB

| Host | Counter |
|---|---|
| host-1 | 721 |
| host-2 | 1044 |
| host-3 | 1045 |
| host-4 | 1046 |

DBDB

| Disk | Boot computer |
|---|---|
| D1 | C5 |
| D2 | C2 |
| D3 | C3 |
| D4 | C4 |

FIG. 8

CDDBi
(i=1,2,3,4)

| Computer | Status | Disk |
|---|---|---|
| C1 | D | — |
| C2 | S | D2 |
| C3 | S | D3 |
| C4 | S | D4 |
| C5 | R | D1 |

FIG. 9

COMPUTER SYSTEM AND FAILED COMPUTER REPLACING METHOD TO THE SAME SYSTEM

TECHNICAL FIELD

The present invention relates to a computer system that is configured by a plurality of computers including a provisioning computer called a provisioning node. More particularly, the present invention relates to a computer system that is favorable for when a computer fails during operation, allowing a provisioning computer to process a boot image that has been processed by the failed computer, and a failed computer replacing method applied to the same system.

BACKGROUND ART

High-density computer systems in which several tens to several hundreds of computer nodes are included in a single housing have recently been on the market. Such a computer system often includes a provisioning computer called a provisioning node. In general, a provisioning computer is not used commonly, but used as an alternative computer (alternative node) when the commonly-used computer fails. For this reason, it is necessary to carry out an operation of setting a boot image, which has been processed by the failed computer, as a boot image of the provisioning computer. If the provisioning computer is booted up after the setting, it can be used in place of the failed computer.

Tetsuo Kaneko and Yoshiya Mori, "Cluster Software," *Toshiba Review*, Vol. 54, No. 12 (1999), pp. 18-21 (referred to as prior art document hereinafter) describes a computer system called a cluster system. In the cluster system, when a computer fails during operation, a service (business operation) that has been executed by the failed computer can be taken over to another computer in the system (fail-over). As the computer that took over the service, for example, a computer in a standby state (hot standby state) is used.

As described above, in the prior art computer system including a provisioning computer (provisioning node), when a computer in the system fails, the failed computer can be replaced with the provisioning computer. However, the prior art computer system requires an operator to replace the failed computer with the provisioning computer.

In the cluster system described in the above prior art document, a service that has been executed by a failed (troubled) computer can automatically be taken over to another computer in the system (fail-over).

In the cluster system, however, the computer to which the service is taken over needs to start up (boot up). It is thus difficult to apply a technique of taking over a service used in the cluster system to a mechanism capable of replacing a failed computer with a provisioning computer.

DISCLOSURE OF INVENTION

The present invention has been developed in consideration of the above situation, and its object is to provide a computer system in which when a computer included therein fails, the failed computer can be replaced with a provisioning computer without any operator.

According to one aspect of the present invention, there is provided a computer system having a plurality of computers including a provisioning computer, the computer system comprising a plurality of storage devices which store boot images to boot said plurality of computers individually, a first storage device which stores a status of each of said plurality of computers, a second storage device which stores information indicative of a correspondence between each of said plurality of storage devices and a computer booted by each of the boot images stored in the storage devices, a failed computer search unit configured to search the computer system for a failed computer, a provisioning computer search unit configured to select a provisioning computer in accordance with the status of each of said plurality of computers stored in the first storage device, the provisioning computer being used in place of a failed computer when the failed computer search unit detects the failed computer, a boot image selecting unit configured to select a storage device in accordance with the information stored in the second storage device, the storage device storing a boot image to boot the provisioning computer selected by the provisioning computer search unit when the failed computer search unit detects the failed computer, and a boot unit configured to boot the provisioning computer selected by the provisioning computer search unit using a boot image stored in the storage device selected by the boot image selecting unit.

BRIEF DESCRIPTION OF DRAWINGS

FIG. 1 is a block diagram showing a configuration of a computer system according to a first embodiment of the present invention;

FIG. 8 is a view showing contents of database DBDB after step S5 in FIG. 6 is executed;

FIG. 9 is a view showing contents of database CDDBi after step S5 in FIG. 6 is executed;

BEST MODE FOR CARRYING OUT THE INVENTION

Figures 2, 3, 4:
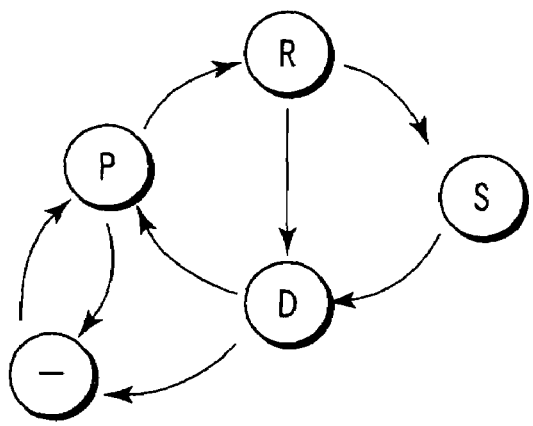
FIG. 2 is a view showing an example of a data structure of database CDDBi (i=1, 2, 3, 4) in FIG. 1.
FIG. 3 is a status transition chart showing a transition of the status of a computer.
FIG. 4 is a view showing an example of a data structure of database DBDB in FIG. 1.

Embodiments of the present invention will be described below with reference to the drawings. FIG. 1 is a block diagram showing a configuration of a computer system according to a first embodiment of the present invention. The computer system shown in FIG. 1 is composed of five computers C1 to C5. The computers C1 to C5 are connected to each other via a network N. Further, the computers C1 to C5 are connected to a storage area network SAN, as is a storage device SS. The storage device SS includes disks (disk drives) D1 to D4. In other words, the computers C1 to C5 and the disks D1 to D4 in the storage device SS are connected together via the storage area network SAN.

The disks D1, D2, D3 and D4 previously store boot images for the computers to which host names "host-1," "host-2," "host-3" and "host-4" are assigned. The boot image stored in the disk Di (i=1, 2, 3, 4) is called a boot image of "host-i." The boot image of "host-i" includes an operating system OSi and an application program that runs on the operating system OSi. In other words, the disk Di is used as a boot disk of "host-i."

Of the computers C1 to C5 shown in FIG. 1, the computers C1 to C4 are booted and operated using boot images stored in the disks D1 to D4. In FIG. 1, the operating systems OS1 to OS4 runs on their respective computers C1 to C4 in service. Assume that the computers C1 to C4 in service recognize their own host names as "host-1" to "host-4" recorded in the boot images of the disks D1 to D4. In FIG. 1, the remaining computer C5 is provided as a provisioning computer called a provisioning node. The computer C5 is not loaded with a boot image including an operating system; thus, it is not booted. The number of provisioning computers need not be one but two or more.

The storage device SS has a database DBDB. The database DBDB holds a management table (management information) for managing a correspondence between the disks D1 to D4 in the storage device SS and computers (boot computers) using the disks D1 to D4 as boot disks.

In the computers C1 to C4 in service, provisioning computer search units PP1 to PP4, boot image setting units BS1 to BS4 and boot units BB1 to BB4 operate. The provisioning computer search unit PPi (i=1, 2, 3, 4) searches for a provisioning computer. The provisioning computer search unit PPi has a database CDDBi. The database CDDBi holds a management table (management information) for managing a relationship between the status of each of the computers C1 to C5 and each of the disks D1 to D4 in the computer system shown in FIG. 1.

The boot image setting unit BSi (indirectly) sets a correspondence between a boot image stored in the disk Di in the storage device SS and a computer to which "host-i" is assigned as a host name such that the boot image is processed by the computer. The setting (boot image setting) of the correspondence between them using the unit BSi is done in accordance with an instruction from a failed computer search process FP. The boot unit BBi boots the computer to which "host-i" is assigned as a host name by the boot image set by the boot image setting unit BSi.

In one of the computers C1 to C4 in service, e.g., the computer C1, the failed computer search process FP operates. The failed computer search process FP functions as a failed computer search unit that searches for a failed computer using a database HDB. The database HDB holds a management table (management information) for managing whether a computer to which "host-i" is assigned is operating (present).

The provisioning computer search unit PPi, boot image setting unit BSi and boot unit BBi, which operate on the computer Ci, are, for example, program units. In the first embodiment, each of the program units is included in a failed computer replacement control program. The units PPi, BSi and BBi are implemented by reading the failed computer replacement control program by the computer Ci (CPU therein not shown). The failed computer search process FP that operates on the computer C1 is also a program unit included in the failed computer replacement control program. The search process FP is also implemented by reading the failed computer replacement control program by the computer C1. It is therefore likely that the search process FP will operate on a computer other than the computer C1.

In the computers C1 to C4 in service, cluster control units CC1 to CC4 operate. The cluster control units CC1 to CC4 communicate with each other via the network N to detect a computer on which trouble has occurred (troubled computer). The cluster control units CC1 to CC4 periodically transmit signals called heart beat signals to each other. Each of the cluster control units CC1 to CC4 determines that trouble has occurred on its corresponding computer when the heart beat signals disappear after a lapse of a given period of time (timeout period). The cluster control units CC1 to CC4 compose one virtual cluster control system CC. The cluster control system CC performs control to take over a service that has been executed by a computer whose trouble has been detected (troubled computer) to another computer. In the first embodiment, the failed computer search process FP is defined in advance as one service to be controlled by the cluster control system CC. In other words, when a computer (computer C1 in FIG. 1) on which the search process FP operates stops due to trouble or the like, the search process FP is controlled by the cluster control system CC such that it can be booted by another computer.

The cluster control unit CCi is implemented by reading and executing software programs for controlling the clusters (cluster software) by the computer Ci. Assume in the first embodiment that the cluster software and the failed computer replacement control program are independent of each other. However, for example, code information corresponding to the failed computer replacement control program can be incorporated into the cluster software in advance.

FIG. 2 shows an example of a data structure of the database CDDBi (i=1, 2, 3, 4) in FIG. 1. As shown in FIG. 2, each of records of the database CDDBi includes items for setting a computer, a status of the computer and information of a disk. As information of the computer, a computer identifier for identifying the computer is used. The status indicates a status of the corresponding computer and represents "service" (S), "provisioning" (P), "down" (D) or "reserve" (R). When the status is "service" (S), a disk identifier is set in the item of a disk in the corresponding record. The disk identifier identifies a disk (storage device) that stores a boot image used for booting up a computer identified by the computer identifier in the record.

The database CDDBi shown in FIG. 2 indicates the status of the computer system shown in FIG. 1. First, the computers C1 to C4 are in the "service" (S) status, or the disks D1 to D4 are each in service as a boot disk. On the other hand, the computer C5 is in the "provisioning" (P) status or serves as a provisioning computer.

FIG. 3 is a status transition chart showing a transition of the status of a computer. In addition to the above four computer statuses, a status (—) in which a computer is not physically incorporated into the system is shown. Referring to FIG. 3, in the first embodiment, the computer in the "provisioning" (P) status (provisioning computer) can change its status to the "service" (S) status via the "reserve" (R) status.

FIG. 4 shows an example of a data structure of the database DBDB in FIG. 1. As shown in FIG. 4, each of records of the database DBDB includes items for setting information (e.g., disk identifier) of a disk (boot disk) that stores a boot image and information (e.g., computer identifier) of a computer using the disk as a boot disk.

Figures 5, 6:
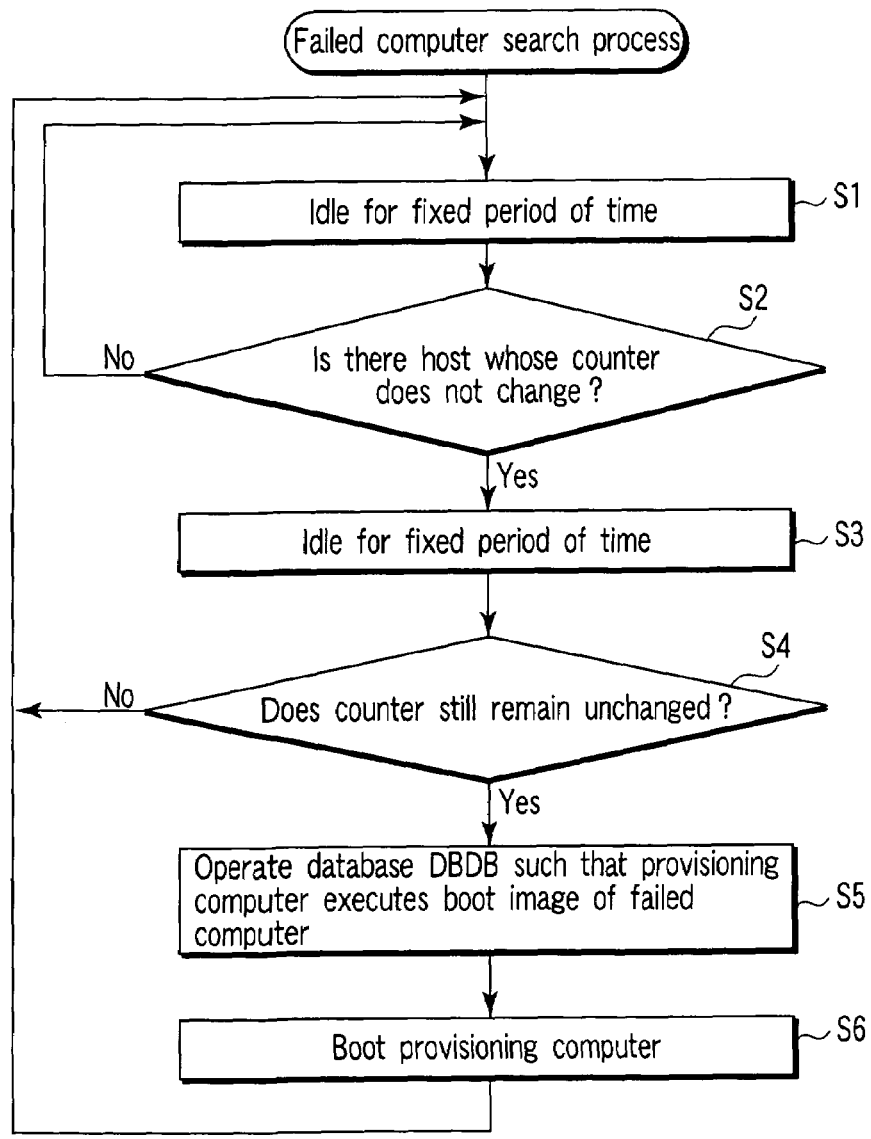
FIG. 5 is a view showing an example of a data structure of database HDB in FIG. 1.
FIG. 6 is a flowchart chiefly showing steps of failed computer search process FP in the first embodiment.

FIG. 5 shows an example of a data structure of the database HDB in FIG. 1. As shown in FIG. 5, each of records of the database HDB includes items for setting information (e.g., host name) indicative of a host and information (e.g., counter value) of a counter. Each time the cluster control unit CCi transmits a heart beat signal within a timeout period, a counter corresponding to a host on which the control unit CCi operates is incremented by one.

Then, an operation of the computer system shown in FIG. 1 will be described with reference to FIG. 6. FIG. 6 is a flowchart chiefly showing steps of the failed computer search process FP. Here is an example of an operation of detecting a failed computer and booting a provisioning computer using a boot image applied to the failed computer. Assume now that the computers C1 to C4 are operating in accordance with the boot images of "host-1" to "host-4" or they are in the "service" (S) status. The boot images of "host-1" to "host-4" are stored in their respective disks D1 to D4 in the storage device SS. Assume also that the computer C5 is located in the computer system as a provisioning computer and in the "provisioning" (P) status. In this case, databases CDDB1 to CDDB4 of the provisioning computer search units PP1 to PP4 of the computers C1 to C4 in service have contents as shown in FIG. 2. The database DBDB in the storage device SS has contents as shown in FIG. 4.

In the computer system shown in FIG. 1, the cluster control unit CCi (i=1, 2, 3, 4) in the cluster control system CC, or the cluster control unit CCi that operates on the computer Ci transmits/receives a heart beat signal. When the cluster control unit CCi can receive a heart beat signal from another cluster control unit CCj (j=1, 2, 3, 4 and j≠i) within a timeout period, a counter in one of records in the database HDB, which corresponds to a host on which the cluster control unit CCj operates, is incremented by one. When a heart beat signal transmitted from the cluster control unit CCj disappears after a lapse of a timeout period, the cluster control system CC determines that trouble has occurred on a computer Cj on which the cluster control unit CCj operates.

Figure 7:
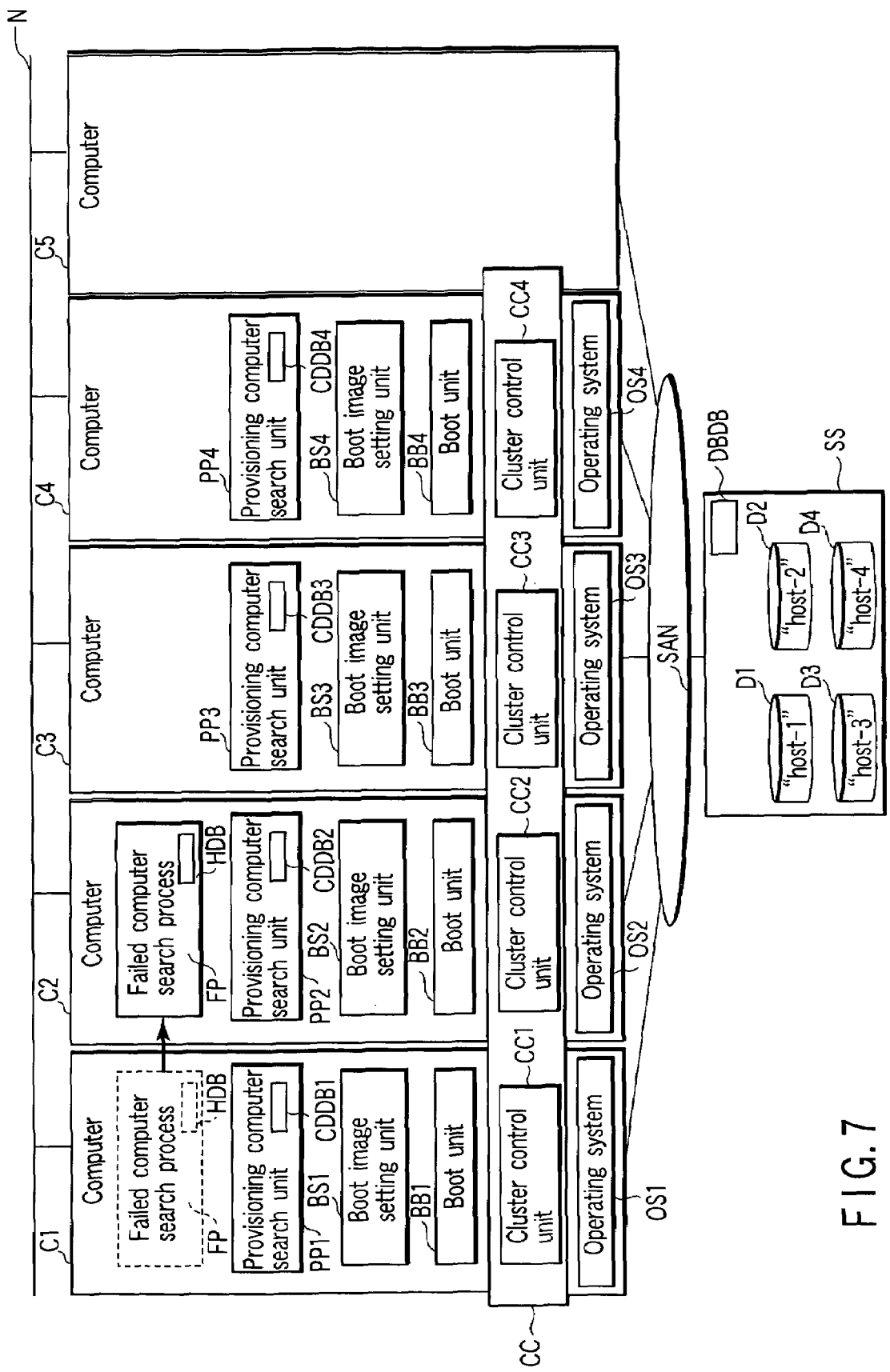
FIG. 7 is a diagram showing a status in which failed computer search process FP is subjected to fail-over from computer C1 to computer C2 in the first embodiment.

Assume here that the computer Cj which is determined as a troubled one by the cluster control system CC is the computer C1 on which the failed computer search process FP operates, or the computer C1 to which "host-1" is assigned as a host name. In the first embodiment, the search process FP is defined as a service to be taken over to another computer (to be subjected to fail-over) when the computer on which the process FP operates is determined as a troubled computer. When the search process FP operates on the computer C1 as in the first embodiment, the computers C2 to C4 are placed as standby computers. Thus, when the computer C1 is determined as a troubled one, the search process FP is taken over to one of the computers C2 to C4. Assume here that the search process FP is taken over to the computer C2 from the troubled computer C1 as shown in FIG. 7. After that, the search process FP operates on the computer C2.

Assume now that no heart beat signal is transmitted from the cluster control unit CCj for a long time after the computer Cj is troubled. In this case, the counter in the database HDB corresponding to the computer Cj does not change for a long time. The failed computer search process FP detects such a status and switches the computer Cj to a provisioning computer by the following steps.

When the failed computer search process FP starts up, it is idled for a fixed period of time (step S1). Then, the search process FP refers to the database HDB and searches for a host whose counter does not change during the fixed period of time (step S2). If there is no host whose counter does not change, or if the counters corresponding to the hosts all change, the search process FP determines that none of the hosts fail. In this case, the search process FP returns to step S1 and is idled. After that, the search process FP repeats steps S1 and S2 unless there is a host whose counter does not change.

In contrast, if there is a host whose counter does not change, the search process FP distinguish a factor in causing a heart beat signal from the cluster control unit of the host to disappear. This factor is one of the facts that the host has failed and the host is rebooted. In order to distinguish the factor, the search process FP is idled for a fixed period of time necessary for rebooting the host (step S3). After that, the search process FP refers again to the database HDB and determines whether the counter of the host, which has been determined as being unchanging before, still remains unchanged (step S4). If the counter still remains unchanged, the search process FP determines that a host corresponding to the counter is not alive and thus the computer has failed. Assume here that the search process FP determines that the computer C1 to which "host-1" is assigned as a host name fails.

The search process FP operates not on the computer C1 but on the computer C2 under the control of the cluster control system CC (see FIG. 7). When the search process FP determines that the computer C1 fails, it causes a provisioning computer search unit PP2 to search for a provisioning computer (provisioning node). This search for a provisioning computer using the provisioning computer search unit PP2 is performed as follows.

First, the provisioning computer search unit PP2 refers to the database CDDB2. Then, the search unit PP2 acquires a computer identifier of a computer in the "provisioning" (P) status from the database CDDB2. In the first embodiment with the database CDDB2 (CDDB1 to CDDB4) shown in FIG. 2, the computer identifier of the computer in the "provisioning" (P) status is C5. In this case, the computer C5 is detected (selected) as a provisioning computer.

If the search unit PP2 detects (selects) the computer C5 as a provisioning computer, it operates the database CDDB2 as follows. When the computer C1 is a failed computer and the computer C5 is a provisioning computer, the search unit PP2 changes the status of the failed computer C1 and that of the provisioning computer C5 to "down" (D) and "reserve" (R), respectively. The operations of the database performed by the search unit PP2 are reflected in the databases CDDB3 and CDDB4 of search units PP3 and PP4 of other computers C3 and C4 in service. Thus, the contents of the databases CDDB3 and CDDB4 are changed to coincide with those of the database CDDB2. The changed contents of the databases CDDB2 to CDDB4 (CDDBi) are shown in FIG. 9.

When the provisioning computer C5 is detected (selected), the failed computer search process FP performs control to cause the provisioning computer C5 to use a boot image that has been used in the failed computer C1. Since the search process FP causes the provisioning computer C5 to process the boot image that has been used in the computer C1, the database DBDB in the storage device SS is operated by the boot image setting unit BS2 (step S5).

The boot image setting unit BS2 selects one of records in the database DBDB, in which the failed computer C1 is set as a boot computer, or a record including information (computer identifier) of the computer C1. As is apparent from FIG. 4, information (disk identifier) of the disk D1, which is paired with the information (computer identifier) of the computer C1, is set in the selected record. The selected record therefore indicates that a boot image that has been used for booting the failed computer C1 is stored in the disk D1.

In order to cause the provisioning computer C5 to process the boot image stored in the disk D1, the boot image setting unit BS2 operates (updates) the selected record as follows. In other words, for the selected record, the setting unit BS2 changes information (computer identifier) of a boot computer, which is pared with information (disk identifier) of the disk D1, from information of the failed computer C1 to that of the provisioning computer C5. The operation of updating a record by the setting unit BS2, or the operation of updating the database DBDB is equivalent to the selection of a boot image, which has been used for booting the failed computer C1, as a boot image for booting the provisioning computer C5. The setting unit BS2 functions as a boot image selecting unit. Since the setting unit BS2 performs an operation of selecting a boot image (operation of database DBDB), the boot image of "host-1" that has been processed by the failed computer C1 (boot image stored in the disk D1) is set indirectly in the provisioning computer C5. The contents of database DBDB are shown in FIG. 8.

When the failed computer search process FP executes step S5 using the boot image setting unit BS2, the boot unit BB2 boots the provisioning computer C5 using the selected boot image (step S6). An operation of booting the provisioning computer C5 will be described in detail below. First, the provisioning computer C5 has an interface circuit not shown. The interface circuit operates as a control circuit for connection with the network N. The interface circuit stands by to receive its own special packet via the network N. Thus, the interface circuit is supplied with standby current at all times. The interface circuit has a function of starting (booting) up a computer (provisioning computer 5) with the interface circuit when it receives a special packet via the network N. The provisioning computer C5 having such an interface circuit is set in such a (standby) state as to allow it to boot up at all times.

The boot unit BB2 transmits a special packet to the provisioning computer C5 via the network N in order to boot up the provisioning computer C5. Upon receipt of the special packet, the interface circuit of the provisioning computer C5 starts an operation of booting the provisioning computer C5 (e.g., an operation of booting a boot loader). The provisioning computer C5 that starts the booting operation refers to the database DBDB in order to search for a disk on which a boot image for booting the provisioning computer C5 is recorded. The provisioning computer C5 refers to the database DBDB and searches for a record in which the identifier of the provisioning computer C5 is set. The provisioning computer C5 boots up using a boot image of "host-1" stored in the disk D1 in the storage device SS in accordance with the identifier of the disk D1 which is recorded on the record in which the identifier of the provisioning computer C5 is set. The technique of transmitting a special packet to a specific computer via the network to boot up the specific computer as described above is widely and commonly known as Wake on LAN (trade name).

Figure 10:
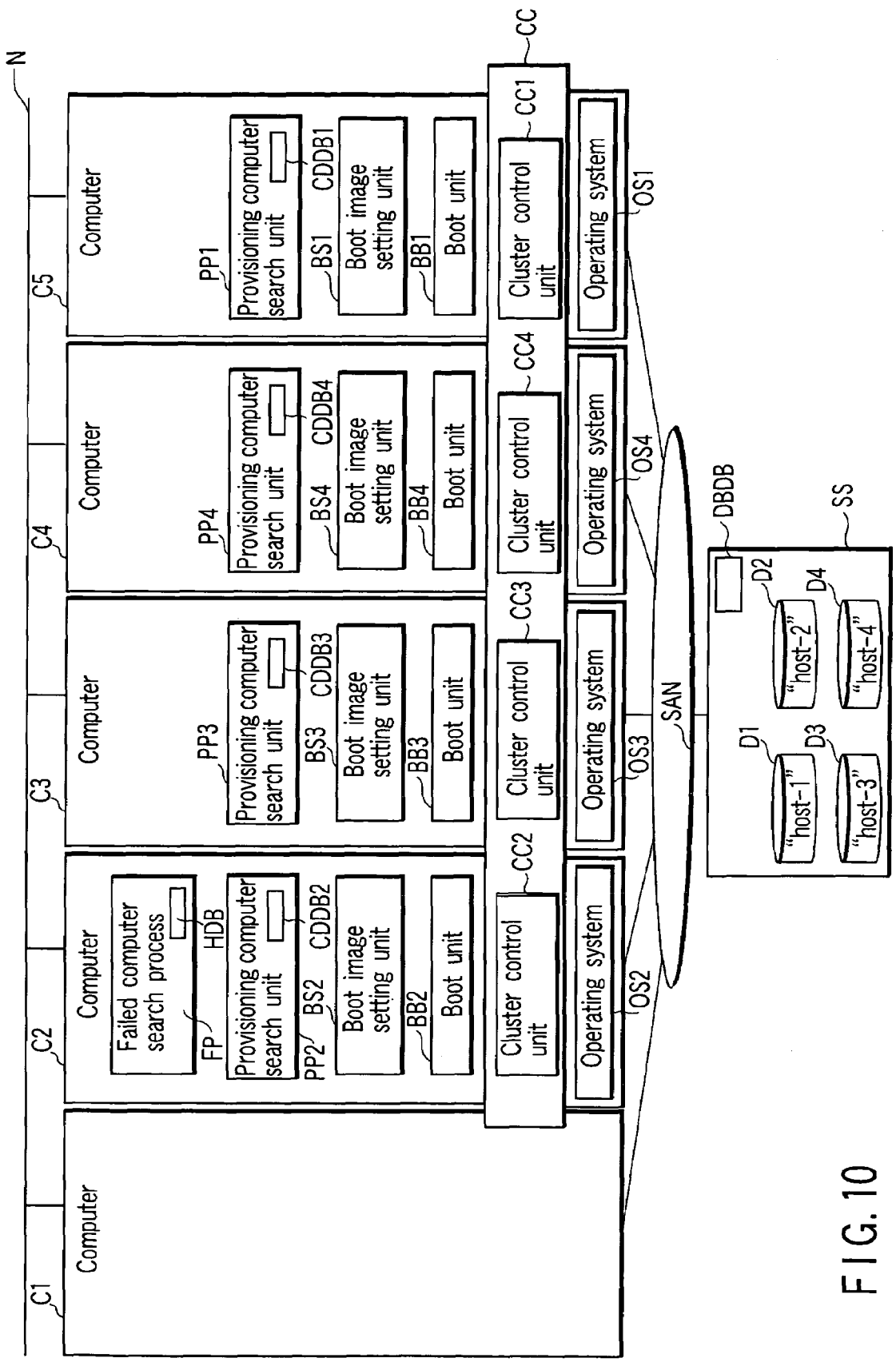
FIG. 10 is a diagram showing a status in which computer C5 can execute a boot image that has been processed by failed computer C1.

Since the above provisioning computer C5 is booted, the computer C5 can execute the boot image of "host-1" that has been processed by the failed computer C1. In other words, the computer C5 boots up as "host-1." Thus, the database CDDB2 is operated to change the status of the computer C5 from "reserve" (R) to "service" (S). Consequently, the operating system OS1, provisioning computer search unit PP1, boot image setting unit BS1, boot unit BB1 and cluster control unit CC1, which have been operating on the computer C1 until the computer C1 fails, come to operate on the computer C5 as shown in FIG. 10.

As described above, in the first embodiment, even though the failed computer search process FP operates on the failed computer C1, it is taken over to another computer (computer C2). Thus, the search process FP can reliably determine that the computer C1 fails. Under the control of the search process FP, search for the provisioning computer, setting for allowing the boot image that has been used by the failed computer C1 to be used by the provisioning computer, and automation of booting the provisioning computer can be achieved using the provisioning computer search unit, boot image setting unit and boot unit (provisioning computer search unit PP2, boot image setting unit BS2, and boot unit BB2) which operate on the computer to which the process FP is taken over.

In the foregoing embodiment, a counter that is incremented each time a heart beat signal is received within a timeout period is used to detect a failure of a host. Monitoring a time period during which no heart beat signal is still received even after a lapse of the timeout period, or the time elapsed from the timeout period (first timeout period), however, a failure of the corresponding host can be determined. The failure of the corresponding host has only to be determined when the time elapsed from the first timeout period exceeds the preset second timeout period.

SECOND EMBODIMENT

Figure 11:
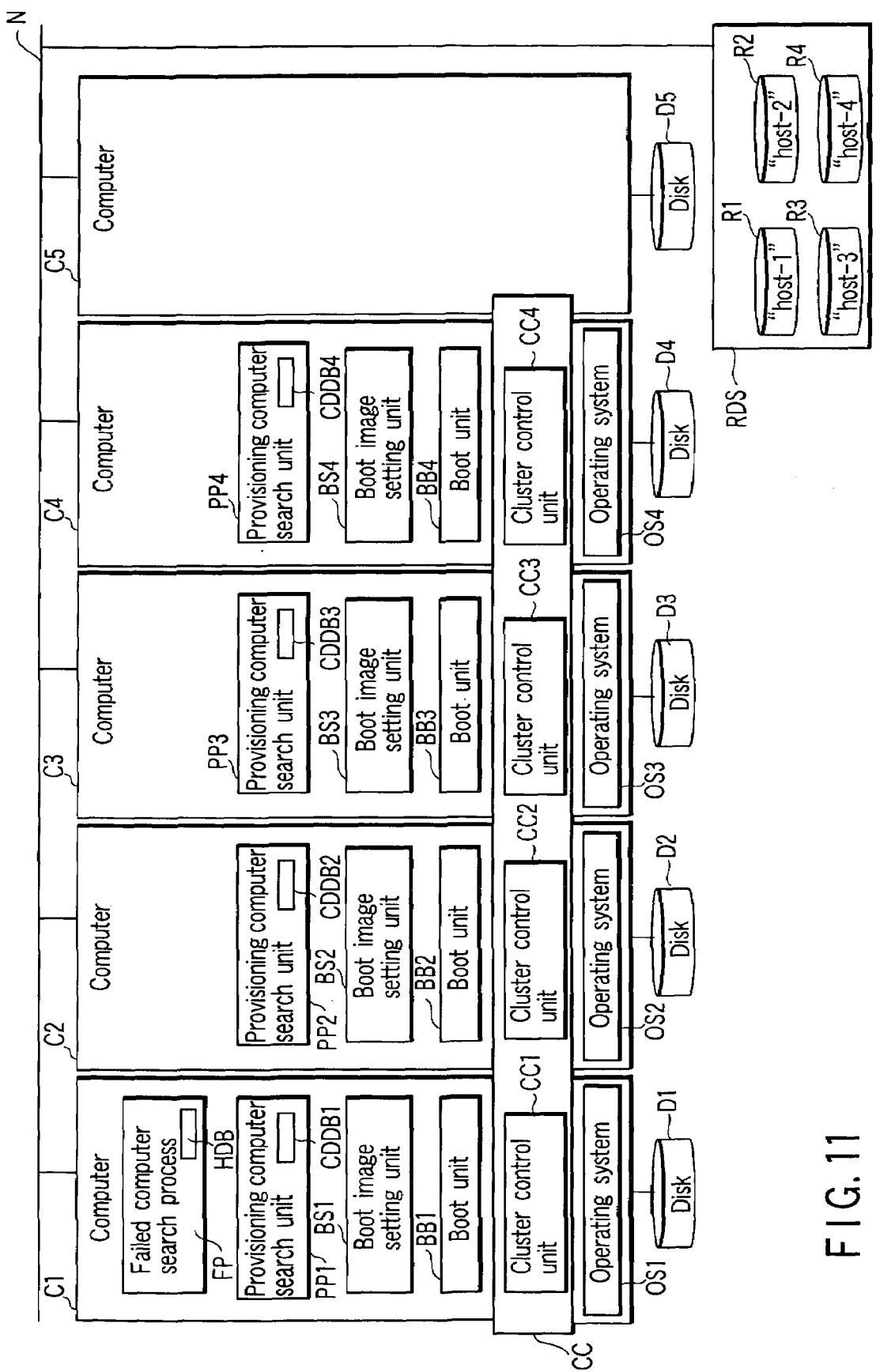
FIG. 11 is a block diagram showing a configuration of a computer system according to a second embodiment of the present invention.

FIG. 11 is a block diagram showing a configuration of a computer system according to a second embodiment of the present invention. In FIG. 11, the constituting elements equivalent for those of the computer system shown in FIG. 1 are denoted by the same reference numerals. First, the configuration of the computer system shown in FIG. 11 will be described with emphasis on the differences between the computers shown in FIGS. 1 and 11. In the computer system shown in FIG. 11, a remote distribution server RDS is connected to the network N. The remote distribution server RDS has disks (disk drives) R1, R2, R3 and R4. The disks R1, R2, R3 and R4 previously store boot images of "host-1," "host-2," "host-3" and "host-4," respectively. Host names "host-1," "host-2," "host-3" and "host-4" are recorded in given positions of the boot images stored in the disks R1, R2, R3 and R4. Assume here that computers C1, C2, C3 and C4 are booted by the boot images stored in the disks R1, R2, R3 and R4, respectively. In this case, the host names of the computers C1, C2, C3 and C4 are "host-1," "host-2," "host-3" and "host-4," respectively.

The computers C1, C2, C3, C4 and C5 include disks (local disk drives) D1, D2, D3, D4 and D5, respectively. The contents of disks R1, R2, R3 and R4 of the remote distribution server RDS are copied in the disks D1, D2, D3 and D4, respectively. If the computers C1, C2, C3 and C4 boot up, the hosts specified by "host-1," "host-2," "host-3" and "host-4" boot up.

Figure 12:
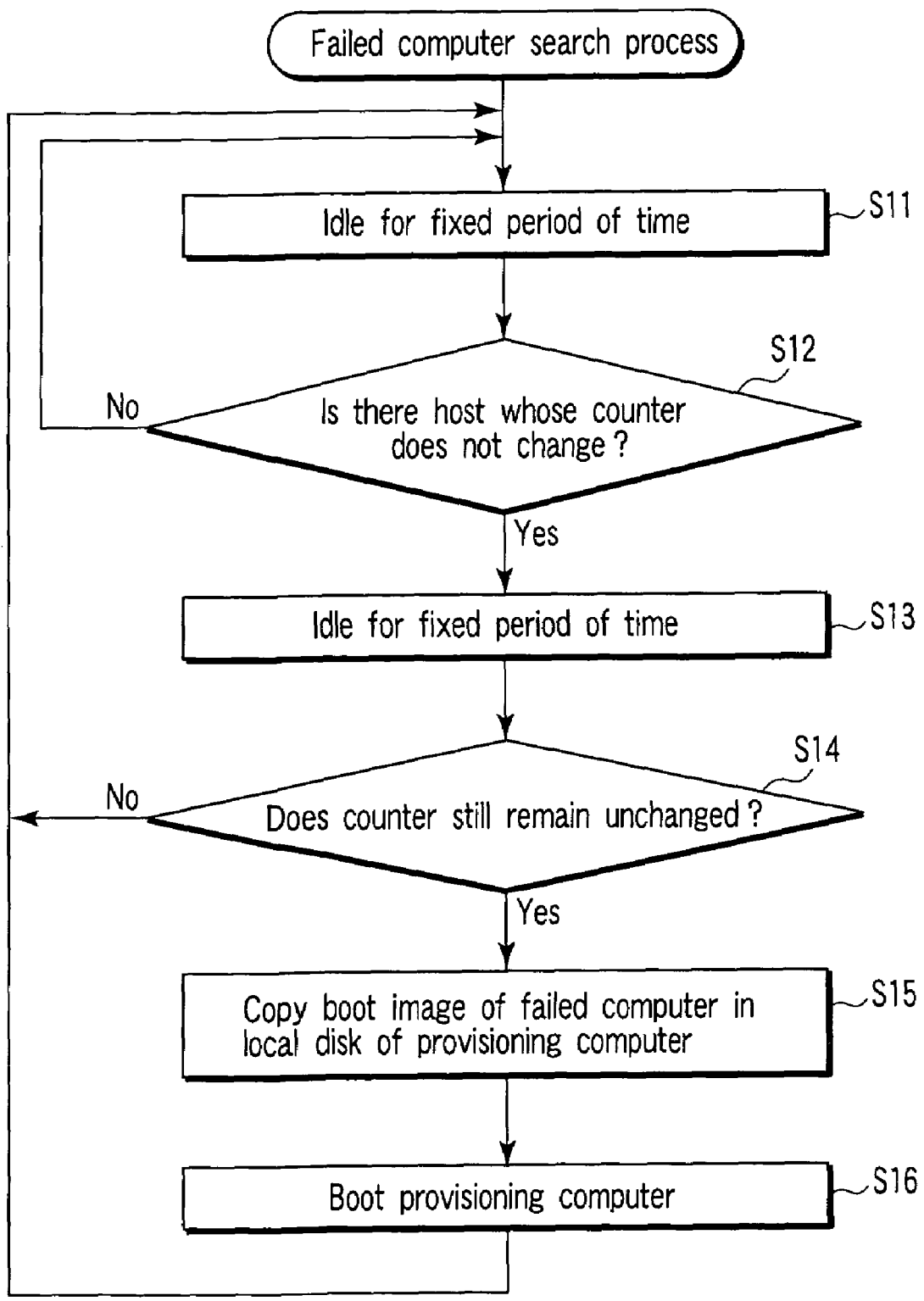
FIG. 12 is a flowchart chiefly showing steps of failed computer search process FP in the second embodiment.

An operation of the computer system shown in FIG. 11 will now be described with reference to FIG. 12. FIG. 12 is a flowchart chiefly showing steps of a failed computer search process FP. Here is an example of an operation of detecting a failed computer and setting a boot image applied to the failed computer in a provisioning computer to boot up the provisioning computer, as in the foregoing first embodiment. Assume now that the computers C1 to C4 are operating in accordance with the boot images of "host-1" to "host-4" copied in the disks D1 to D4, or they are in the "service" (S) status. Also, assume that the computer C5 is located in the computer system as a provisioning computer and set in the "provisioning" (P) status. Moreover, assume that the failed computer search process FP operates on the computer C1. In the normal state where none of the computers C1 to C4 fail, the search process FP repeats the operations (steps S11 and S12) corresponding to steps S1 and S2 in FIG. 6.

Assume that the computer C1 fails under the above conditions as in the first embodiment. In this case, the search process FP performs the operations (steps S11, S12, S13 and S14) corresponding to steps S1, S2, S3 and S4 in FIG. 6 to determine the failure of the computer C1. The search process FP is taken over to any one of standby computers C2 to C4, e.g., the computer C2 in the stage described next. In this stage, no heart beat signals are transmitted from the cluster control unit CC1 that operates on the computer C1 after a lapse of a timeout period and consequently the cluster control system CC detects that the computer C1 fails.

When the search process FP determines the failure of the computer C1, it causes the provisioning computer search unit PP2 to search for a provisioning computer. Assume here that the computer C5 is detected (selected) as a provisioning computer as in the first embodiment. Then, the search process FP performs control to cause the provisioning computer C5 to use the boot image of "host-1" that has been used by the failed computer C1. In order to process the boot image of "host-1" in the provisioning computer C5, the search process FP causes the boot image setting unit BS2 to copy the boot image in the local disk D5 of the provisioning computer C5 (step S15). The boot image of "host-1" is stored in the disk R1 in the remote distribution server RDS. The boot image setting unit BS2 selects the disk R1 from the remote distribution server RDS. Then, the boot image setting unit BS2 copies the boot image of "host-1" stored in the disk R1, in the local disk D5 of the provisioning computer C5 (step S15). As described above, in the second embodiment, the boot image of "host-1" that has been processed in the failed computer C1 is directly set in the provisioning computer C5 detected (selected) by the failed computer search process FP. In this respect, the second embodiment differs from the first embodiment that the boot image of "host-1" that has been processed in the failed computer C1 is indirectly set in the provisioning computer C5.

Next, the search process FP causes the boot unit BB2 to boot the provisioning computer C5 in accordance with the boot image of "host-1" copied in the disk D5 of the provisioning computer C5 (step S16). The operation of booting the computer C5 by the boot unit BB2 is performed in the same manner as that in the first embodiment. Thus, the computer C5 is booted as "host-1." Consequently, the operating system OS1, provisioning computer search unit PP1, boot image setting unit BS1, boot unit BB1 and cluster control unit CC1, which have been operating on the computer C1 until the computer C1 fails, come to operate on the computer C5.

THIRD EMBODIMENT

Figure 13:
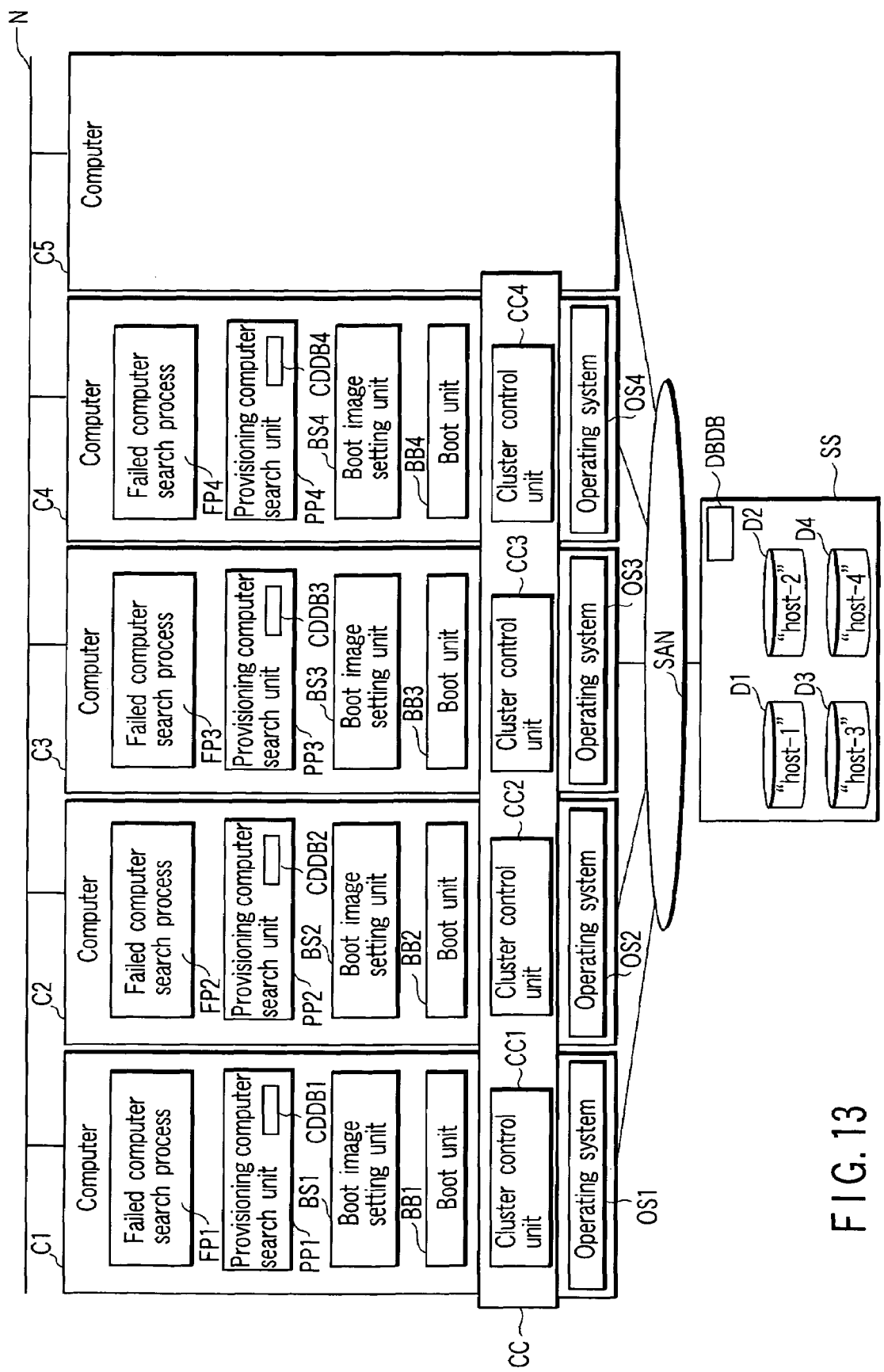
FIG. 13 is a block diagram showing a configuration of a computer system according to a third embodiment of the present invention.

FIG. 13 is a block diagram showing a configuration of a computer system according to a third embodiment of the present invention. In FIG. 13, the constituting elements equivalent for those of the computer system shown in FIG. 1 are denoted by the same reference numerals. First, the configuration of the computer system shown in FIG. 13 will be described with emphasis on the differences between the computers shown in FIGS. 1 and 13. Assume in the computer system shown in FIG. 13 that computers C1, C2, C3 and C4 are operating in accordance with the boot images of "host-1," "host-2," "host-3" and "host-4" stored in disks D1, D2, D3 and D4 in a storage device SS, or they are in the "service" (S) status. On the computers C1, C2, C3 and C4, failed computer search processes FP1, FP2, FP3 and FP4 operate in parallel with each other. The search processes FP1, FP2, FP3 and FP4 correspond to the search process FP shown in FIG. 1.

The feature of the failed computer search processes FP1, FP2, FP3 and FP4 lies in that they operate on the computers (computers C1, C2, C3 and C4) which are booted by the boot images of host names "host-1," "host-2," "host-3" and "host-4." In this respect, the search processes FP1, FP2, FP3 and FP4 differ from the above search process FP which is only one that operates on one of the computers in the system. The feature of the search processes FP1, FP2, FP3 and FP4 lies in that each search process can recognize a computer on which it is to operate. In other words, the search processes FP1, FP2, FP3 and FP4 recognize that the host names (their own host names) assigned to the computers on which they are operating are "host-1," "host-2," "host-3" and "host-4" recorded in the boot images stored in the disks D1, D2, D3 and D4 in the storage device SS. The search processes FP1, FP2, FP3 and FP4 search for a failed computer using a function of recognizing the host names. Unlike the search process FP, the search processes FP1, FP2, FP3 and FP4 do not require the database HDB to search for a failed computer.

In the third embodiment, the failed computer search processes FP1, FP2, FP3 and FP4 are defined in advance as a service controlled by the cluster control system CC. In other words, when the computers (computers C1, C2, C3 and C4 in FIG. 13) on which the processes FP1, FP2, FP3 and FP4 are operating are stopped due to trouble or the like, the processes FP1, FP2, FP3 and FP4 are controlled by the cluster control system CC such that they can be booted by another computer.

Figure 14:
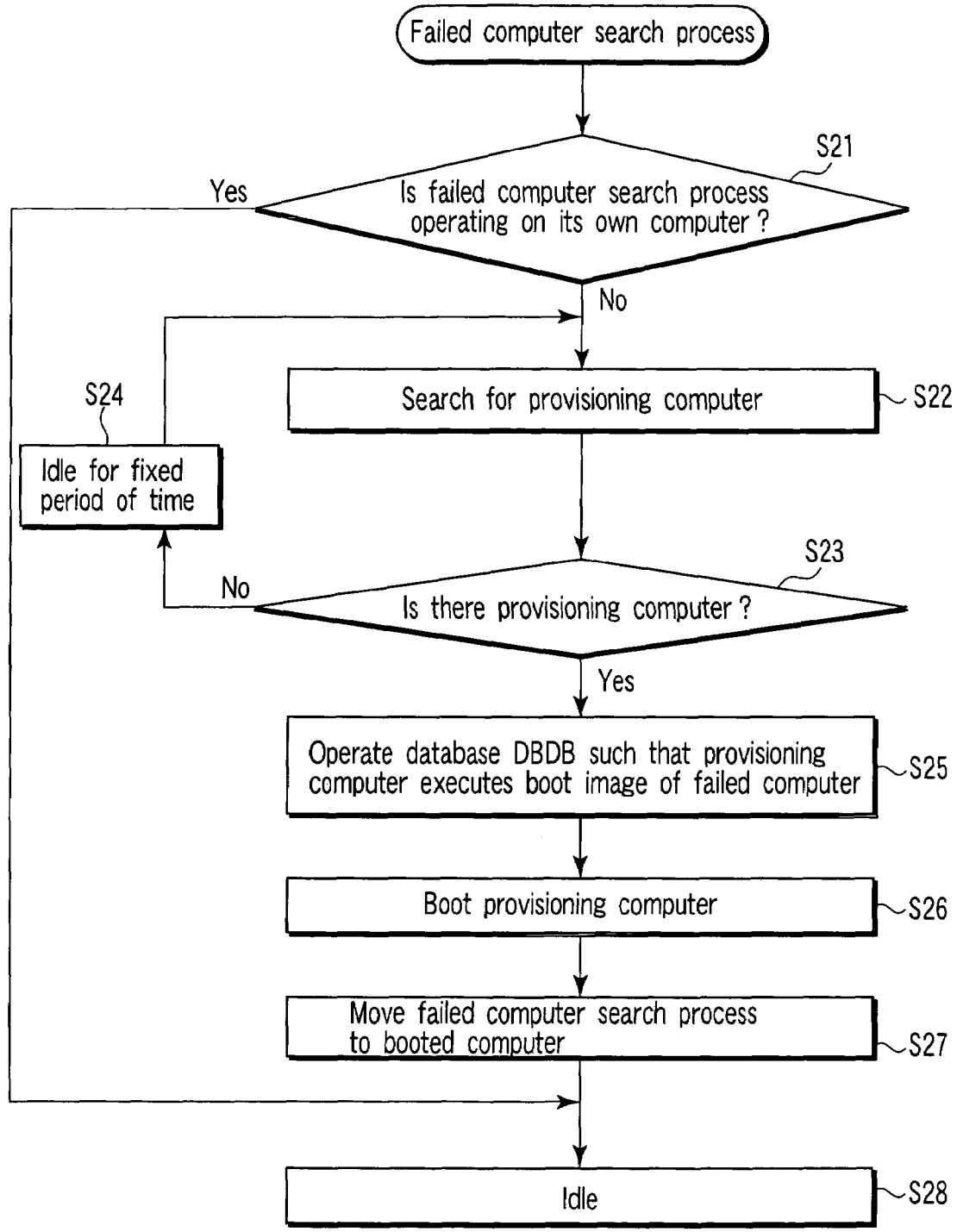
FIG. 14 is a flowchart chiefly showing steps of failed computer search process FP in the third embodiment.

An operation of the computer system shown in FIG. 13 will now be described with reference to FIG. 14. FIG. 14 is a flowchart chiefly showing steps of a failed computer search process FP1 (FPi). Here is an example of an operation of detecting a failed computer C1 by the failed computer search process FP1 and setting a boot image applied to the failed computer C1 in a provisioning computer to boot up the provisioning computer.

First, when the failed computer search process FP1 starts up, it determines whether it is operating on a computer on which it is to operate, i.e., the computer C1 whose host name is "host-1" (step S21). Usually, the search process FP1 operates on the computer C1 as shown in FIG. 13. In this case, the search process FP1 is idled until it starts up next (step S28).

Assume now that the computer C1 on which the search process FP1 is operating fails. Thus, the search process FP1 is moved from the failed computer C1 to another computer in the computer system under the control of the cluster control system CC (fail-over). In other words, a section in which the search process FP1 starts up is changed from the failed computer C1 to another computer. Thus, the search process FP1 comes to operate on a computer other than the computer (C1) with host name "host-1" on which the search process FP1 is to operate. Assume here that the search process FP1 is started up by the computer C2 with host name "host-2."

When the search process FP1 is started up by the computer C2, it determines that it is operating on a computer (computer C2 with host name "host-2") other than the computer C1 with host name "host-1" on which the search process FP1 is to operate. Thus, the search process FP1 recognizes that the computer C1 with host name "host-1" on which the search process FP1 was originally operating fails. In this case, the search process FP1 searches for a provisioning computer using the provisioning computer search unit PP2 on the computer C2 on which the search process FP1 is currently operating (steps S22 and S23). As in the first embodiment, the search for a provisioning computer using the search unit PP2 is achieved by acquiring a computer identifier of a computer in the "provisioning" (P) status with reference to the database CDDB2. If there is no computer in the "provisioning" (P) status, the failed computer search process FP1 is idled for a given period of time (step S24) and then searches for a provisioning computer again using the provisioning computer search unit PP2 (steps S22 and S23).

Assuming now that the database CDDB2 (CDDBi) is one as shown in FIG. 2, the computer C5 is detected as a provisioning computer. When the provisioning computer C5 is detected (selected), the failed computer search process FP1 performs the operations (steps S25 and S26) corresponding to steps S5 and S6 in FIG. 6. In other words, the search process FP1 performs control to cause the provisioning computer C5 to use the boot image of "host-1" that has been used by the failed computer C1. In order to process the boot image of "host-1" by the provisioning computer C5, the search process FP1 causes the boot image setting unit BS2 on the computer C2 on which the search process FP1 is currently operating to operate the database DBDB in the storage device SS (step S25). With the operation of the database DBDB, the boot image that has been used for booting the failed computer C1 is selected as a boot image for booting the provisioning computer C5, as in the first embodiment. Then, the search process FP1 causes the boot unit BB2 on the computer C2 on which the search process FP1 is currently operating to boot the provisioning computer C5 using the selected boot image of "host-1" (step S26). Thus, the computer C5 can process the boot image of "host-1" that has been done by the failed computer C1. In other words, the computer C5 boots up as "host-1" and the operating system OS1, provisioning computer search unit PP1, boot image setting unit BS1, boot unit BB1 and cluster control unit CC1, which have been operating on the computer C1 until the computer C1 fails, come to operate on the computer C5.

Assume that the provisioning computer C5 is booted by the boot image of "host-1" that has been processed by the failed computer C1, or assume that the computer C5 is booted as "host-1." Thus, the failed computer search process FP1 that is to originally operate on the computer of "host-1" is moved (returned) from the computer C2 whose host name is "host-2" to the computer C5 whose host name is "host-1," which is booted as "host-1" (step S27). The operation of moving (returning) the search process FP1 to the computer with host name "host-1" on which the search process FP1 is to originally operate (i.e., a fail-back operation) is performed by the cluster control system CC. After that, the search process FP1 is idled until it is started next (step S28).

In the foregoing third embodiment, the provisioning computer search unit PP1 (PPi), boot image setting unit BS1 (BSi) and boot unit BB1 (BBi) are independent of the failed computer search process FP1 (FPi). However, the provisioning computer search unit PP1 (PPi), boot image setting unit BS1 (BSi) and boot unit BB1 (BBi) can be configured to be associated with (included in) the failed computer search process FP1 (FPi). In this configuration, when the failed computer search process FP1 is moved from the computer C1 to the computer C2 under the control of the cluster control system CC, the provisioning computer search unit PP1, boot image setting unit BS1 and boot unit BB1 are also moved to the computer C2. In this case, the failed computer search process FP1 performs the process shown in the flowchart of FIG. 14 using the provisioning computer search unit PP1, boot image setting unit BS1 and boot unit BB1.

In the foregoing third embodiment, there is a possibility that even when the computer C1 temporarily fails, the failed computer search process FP1 will be moved to the computer C2 to boot the provisioning computer C5 by the boot image that has been processed by the computer C1. Therefore, the cluster control system CC can move the failed computer search process FP1 (FPi) from the failed computer to another computer (fail-over) using a timeout period that is longer than the timeout period used for detecting a computer failure, unlike another service.

FOURTH EMBODIMENT

Figure 15:
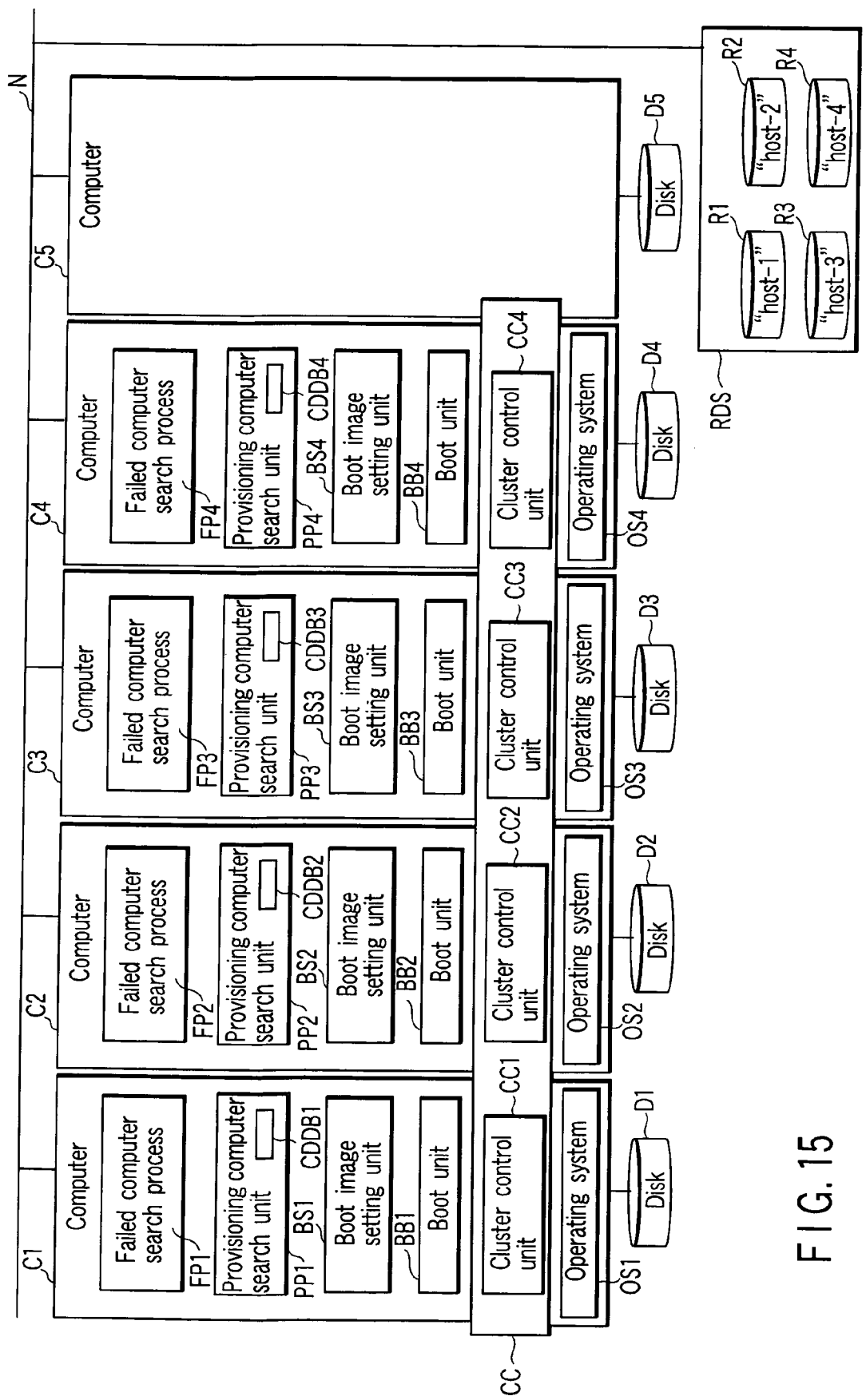
FIG. 15 is a block diagram showing a configuration of a computer system according to a fourth embodiment of the present invention.
Figure 16:
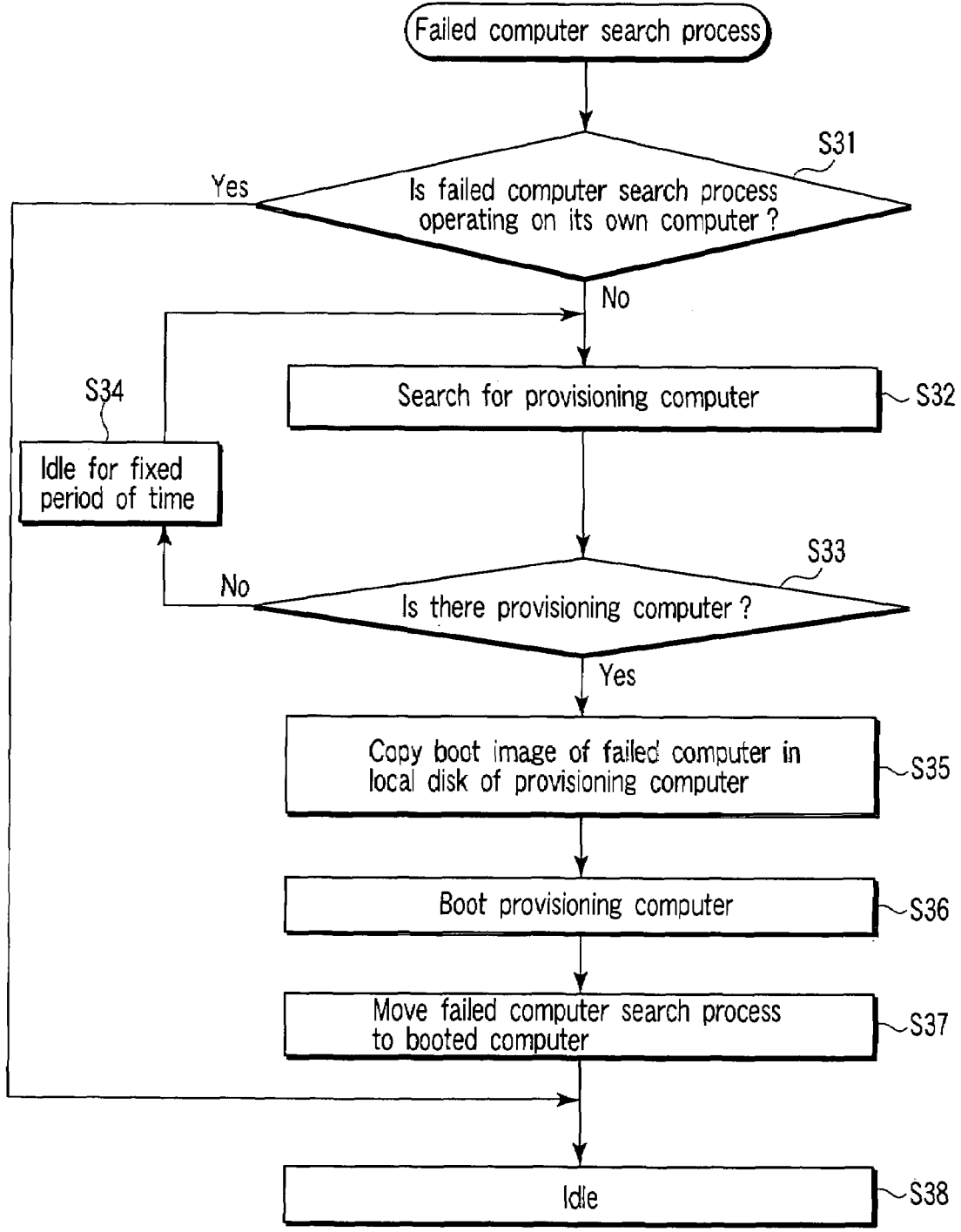
FIG. 16 is a flowchart chiefly showing steps of failed computer search process FP in the fourth embodiment.

FIG. 15 is a block diagram showing a configuration of a computer system according to a fourth embodiment of the present invention. In FIG. 15, the constituting elements equivalent for those of the computer system shown in FIG. 11 or 13 are denoted by the same reference numerals. The point in which the computer system shown in FIG. 15 differs from the computer system according to the third embodiment shown in FIG. 13 is identical with the point in which the computer system according to the second embodiment shown in FIG. 11 differs from the computer system according to the first embodiment shown in FIG. 1. The steps of a failed computer search process FP1 (FPi) in the computer system shown in FIG. 15 are shown by the flowchart of FIG. 16. As is apparent from FIG. 16, the failed computer search process FP1 (FPi) performs the operations (steps S31 to S38) corresponding to steps S21 to S28 shown in the flowchart of FIG. 14 in the third embodiment. However, the operation of step S37 is performed by the cluster control system CC as in step S27 in FIG. 14. The flowchart of FIG. 16 differs from that of FIG. 14 in the operation (step S35) corresponding to step S25 in FIG. 14. In other words, it differs in the operation of causing the provisioning computer C5 to use the boot image that has been used by the failed computer C1. In step S35, the boot image that has been used by the failed computer C1, i.e., the boot image that is stored in the disk R1 in the remote distribution server RDS is copied in the local disk D5 of the provisioning computer C5. This operation is the same as that of step S15 in FIG. 12.

The following technique is applied to the first to fourth embodiments described above. When a computer that has processed a boot image fails, a provisioning computer is booted by the boot image using the detection of the failure of the computer as a trigger. If this technique is applied, the provisioning computer can be booted by the boot image that has been processed by a computer using as a trigger the fact that the load of the computer becomes higher than a reference value. In this case, the failed computer search process need not always be taken over. Moreover, the same computer can be booted by a boot image that varies with time using the coming of preset time as a trigger. In other words, the same computer can be booted by a first boot image including a first operating system in the daytime, and it can be booted by a second boot image including a second operating system in the nighttime. This configuration is particularly applied to the computer system shown in FIG. 1 or 13, which does not need to copy a boot image.

The present invention is not limited to the above embodiments, but the components of the embodiments can be modified without departing from the scope of the subject matter of the invention in the stages of reduction to practice. Various inventions can be obtained from appropriate combinations of the components of the embodiments. For example, some can be deleted from all the components of the embodiments. The components of different embodiments can be combined appropriately.

INDUSTRIAL APPLICABILITY

According to the present invention, when a computer fails, a provisioning computer can be booted by setting a boot image in the provisioning computer such that the provisioning computer can be used in place of the failed computer.

The invention claimed is:

1. A computer system comprising:
a plurality of computers including a provisioning computer;
a plurality of storage devices which store boot images to boot said plurality of computers individually, the boot images including operating systems;
a first storage device which stores a status of each of said plurality of computers; and
a second storage device which stores information indicative of a correspondence between each of said plurality of storage devices and a computer booted by each of the boot images stored in the storage devices,
wherein each of said plurality of computers except the provisioning computer includes:
a failed computer search unit configured to search the computer system for a failed computer, wherein:
the failed computer search unit on the failed computer is defined as a service to be taken over to a computer other than the provisioning computer and the failed computer;
a provisioning computer search unit configured to select the provisioning computer in accordance with the status of each of said plurality of computers stored in the first storage device, the provisioning computer being used in place of the failed computer when the failed computer search unit detects the failed computer;
a boot image selecting unit configured to select a storage device in accordance with the information stored in the second storage device, the storage device storing a boot image to boot the provisioning computer selected by the provisioning computer search unit when the failed computer search unit detects the failed computer; and
a boot unit configured to boot the provisioning computer selected by the provisioning computer search unit using the boot image stored in the storage device selected by the boot image selecting unit.

2. The computer system according to claim 1, wherein the failed computer search unit includes a first determination unit configured to periodically determine whether each of said plurality of computers is normally operating, and a second determination unit configured to determine that a computer, which is determined as not normally operating by the first determination unit, fails if the computer does not operate normally after a lapse of a given period of time after determination of the first determination unit.

3. The computer system according to claim 1, further comprising a cluster control system configured to detect the failed computer which fails in the computer system and take over the service which is executed in the failed computer to the computer other than the provisioning computer and the failed computer,
wherein the cluster control system is configured to take over the failed computer search unit operating on the failed computer to the computer other than the provisioning computer and the failed computer.

4. The computer system according to claim 3, further comprising a third storage device which stores management information to manage whether each of the computers booted by the boot images stored in said plurality of storage devices is operating,
wherein the cluster control system periodically monitors the computers booted by the boot images stored in said plurality of storage devices to update the management information stored in the third storage device, and
the failed computer search unit searches the computer system for the failed computer based on the management information stored in the third storage device.

5. The computer system according to claim 4, wherein the cluster control system includes a plurality of cluster control units configured to detect the failed computer by periodically performing communication with each of operating computers of said plurality of computers, and the cluster control units are configured to update the management information stored in the third storage device in accordance with a result of the communication.

6. A computer system comprising:
a plurality of computers including a provisioning computer;
a plurality of storage devices which store boot images to boot said plurality of computers individually, the boot images including operating systems;
a first storage device which stores a status of each of said plurality of computers; and
a second storage device which stores information indicative of a correspondence between each of said plurality of storage devices and a computer booted by each of the boot images stored in the storage devices,
wherein each of said plurality of computers except the provisioning computer includes:
a failed computer search unit configured to search the computer system for a failed computer wherein:
the failed computer search unit operating on the failed computer is defined as a service to be taken over to a computer other than the provisioning computer and the failed computer; and
another failed computer search unit is configured to determine that the failed computer failed;
a provisioning computer search unit configured to select the provisioning computer in accordance with the status of each of said plurality of computers stored in the first storage device, the provisioning computer being used in place of the failed computer when the failed computer search unit detects the failed computer;
a boot image selecting unit configured to select a storage device in accordance with the information stored in the second storage device, the storage device storing a boot image to boot the provisioning computer selected by the provisioning computer search unit when the failed computer search unit detects the failed computer; and
a boot unit configured to boot the provisioning computer selected by the provisioning computer search unit using the boot image stored in the storage device selected by the boot image selecting unit.

7. The computer system according to claim 6, further comprising a cluster control system configured to detect the computer which fails in the computer system and take over the service which has been executed in the failed computer to the computer other than the provisioning computer and the failed computer,
  wherein the cluster control system is configured to take over the failed computer search unit operating on the failed computer to the computer other than the provisioning computer and the failed computer.

8. The computer system according to claim 7, wherein the cluster control system includes a plurality of cluster control units configured to detect the failed computer by operating on operating computers of said plurality of computers and periodically communicating with each other.

9. A method of using a provisioning computer in place of a failed computer, which is applied to a computer system configured by a plurality of computers including the provisioning computer, the method comprising:
  searching the computer system for the failed computer, the searching being performed by a specific process that operates on any operating one of said plurality of computers;
  selecting the provisioning computer in accordance with a status of each of said plurality of computers stored in a first storage device, the provisioning computer being used in place of the failed computer detected by the searching;
  selecting a storage device from a plurality of storage devices that store boot images to boot said plurality of computers in accordance with information indicative of a correspondence between each of said plurality of storage devices and a computer booted by a boot image stored in said each of plurality of storage devices, the boot images including operating systems, the storage device storing a boot image to boot the provisioning computer selected in place of the failed computer, and the information being stored in a second storage device;
  booting the selected provisioning computer using the boot image stored in the selected storage device; and
  moving the specific process operating on the failed computer to a computer other than the provisioning computer and the failed computer.

10. A method of using a provisioning computer in place of a failed computer, which is applied to a computer system configured by a plurality of computers including the provisioning computer, the method comprising:
  searching the computer system for the failed computer, the searching being performed by a plurality of specific processes that operate on all of operating computers of said plurality of computers;
  selecting the provisioning computer in accordance with a status of each of said plurality of computers stored in a first storage device, the provisioning computer being used in place of the failed computer detected by the searching;
  selecting a storage device from a plurality of storage devices that store boot images to boot said plurality of computers in accordance with information indicative of a correspondence between each of said plurality of storage devices and a computer booted by a boot image stored in said each of plurality of storage devices, the boot images including operating systems, the storage device storing a boot image to boot the provisioning computer selected in place of the failed computer, and the information being stored in a second storage device;
  booting the selected provisioning computer using the boot image stored in the selected storage device; and
  moving a specific process that has been operated on the failed computer to a computer other than the provisioning computer and the failed computer.

11. The method according to claim 10, wherein the searching includes determining that a computer for which the searching is to perform fails when the searching is not performed for the computer.

* * * * *

UNITED STATES PATENT AND TRADEMARK OFFICE
CERTIFICATE OF CORRECTION

| | | |
|---|---|---|
| PATENT NO. | : 7,478,230 B2 | Page 1 of 1 |
| APPLICATION NO. | : 10/556051 | |
| DATED | : January 13, 2009 | |
| INVENTOR(S) | : Mizoguchi | |

It is certified that error appears in the above-identified patent and that said Letters Patent is hereby corrected as shown below:

Title page, item (54), in the title, change "METHOD TO" to --METHOD APPLIED TO--.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,478,230 B2 | Page 1 of 1 |
| APPLICATION NO. | : 10/556051 | |
| DATED | : January 13, 2009 | |
| INVENTOR(S) | : Mizoguchi | |

It is certified that error appears in the above-identified patent and that said Letters Patent is hereby corrected as shown below:

Title page, item (54) and column 1, line 2, in the title, change "METHOD TO" to --METHOD APPLIED TO--.

This certificate supersedes the Certificate of Correction issued April 7, 2009.

Signed and Sealed this

Twenty-eighth Day of April, 2009

JOHN DOLL
*Acting Director of the United States Patent and Trademark Office*